United States Patent

Bartocci

[15] 3,678,483

[45] July 18, 1972

[54] TERMINAL EQUIPMENT FOR THE TRANSMISSION OF DATA WITH DISPLAY AND INPUT AND OUTPUT UNITS

[72] Inventor: Antonio Bartocci, Ivrea, Italy

[73] Assignee: Ing. C. Olivetti & C., S.p.A., Ivrea (Turin), Italy

[22] Filed: May 18, 1970

[21] Appl. No.: 38,215

[30] Foreign Application Priority Data

May 19, 1969 Italy ........................51906 A/69

[52] U.S. Cl. ........................340/172.5

[51] Int. Cl. ........................G06f 3/00

[58] Field of Search ........................340/172.5

[56] References Cited

UNITED STATES PATENTS

| | | | |
|---|---|---|---|
| 3,364,473 | 1/1968 | Reitz et al. | 340/172.5 |
| 2,883,106 | 4/1959 | Cornwell et al. | 340/172.5 X |
| 3,417,379 | 12/1968 | Heard et al. | 340/172.5 |

*Primary Examiner*—Raulfe B. Zache

*Attorney*—Birch, Swindler, McKie & Beckett

[57] ABSTRACT

A data communication system comprises a central data processer and a terminal equipment for interrogation of an reply to the processer, said equipment comprising input and output units, a recirculating serial store, a keyboard and a displaying device. The system is provided with a control unit data terminal equipment for interrogation and reply comprising a recirculating serial store, a keyboard for operator control of the equipment and entry of information into the store, a device for displaying the information for transmission and reception respectively, from and to a central data processer, for permitting the dispatch of the information from the store to a peripheral output unit, and also for permitting the input of information coming from a peripheral input unit, and the control unit being responsive to an instruction coming from either the keyboard or from the central processer or from the peripheral input unit to enable the passage of the control unit from various different states into one fixed state capable of producing the said dispatch to the peripheral output unit.

3 Claims, 5 Drawing Figures

INVENTOR.
ANTONIO BARTOCCI

INVENTOR
ANTONIO BARTOCCI

INVENTOR.
ANTONIO BARTOCCI

INVENTOR
ANTONIO BARTOCCI

TERMINAL EQUIPMENT FOR THE TRANSMISSION OF DATA WITH DISPLAY AND INPUT AND OUTPUT UNITS

BACKGROUND OF THE INVENTION

1. Field of the Invention

The present invention relates to a terminal equipment for interrogation and reply, which can be connected to an input unit, an output unit and a central data processer and provided with means for displaying the information.

2. Description of the Prior Art

Known terminal equipment with means for displaying a message received from a central processer is not provided with adequate flexibility in respect of the possibility of being connected to peripheral input and output units. In fact, known terminal equipment displays only the information received from the central processer and stored in its own store, then sending it in a second stage to a peripheral output unit such a printer. Often, however, the need is felt at the terminal station to have, in addition to input from the keyboard and subsequent possibility of control on the screen, an eventual means of automatic input especially for the introduction of fixed data into the store of the terminal. After the message received from the peripheral input unit is screened, the keyboard operator can complete the message by adding variable data, at the same time obtaining a permanent copy of the message itself.

Other example of organizational requirements can be given, but at the root of all these requirements there is a need for flexible integration between the terminal unit, the peripheral units and the central processer. The known terminal equipment which has the possibility of being connected to peripheral units does not allow optimization or at least sufficient integration of the various units of the system and of the operation connected with the system itself.

SUMMARY OF THE INVENTION

These and other disadvantages are obviated by the present invention, which provides data terminal equipment for interrogation and reply comprising a recirculating serial store, a keyboard for operator control of the equipment and entry of information into the store, a device for displaying the information contained in the store, a control unit adapted to assume various different states for permitting the input and output of the said information for the transmission respectively from and to a central data processer, for permitting the dispatch of the information from the store to a peripheral output unit, and also for permitting the input of information coming from a peripheral input unit, and the control unit being responsive to an instruction coming from either the keyboard or from the central processer or from the peripheral input unit to enable the passage of the control unit from various different states into one fixed state capable of producing the said dispatch to the peripheral output unit.

The invention will be described in more detail, by way of example, with reference to the accompanying drawings.

DESCRIPTION OF THE PREFERRED EMBODIMENTS

Figure 1:
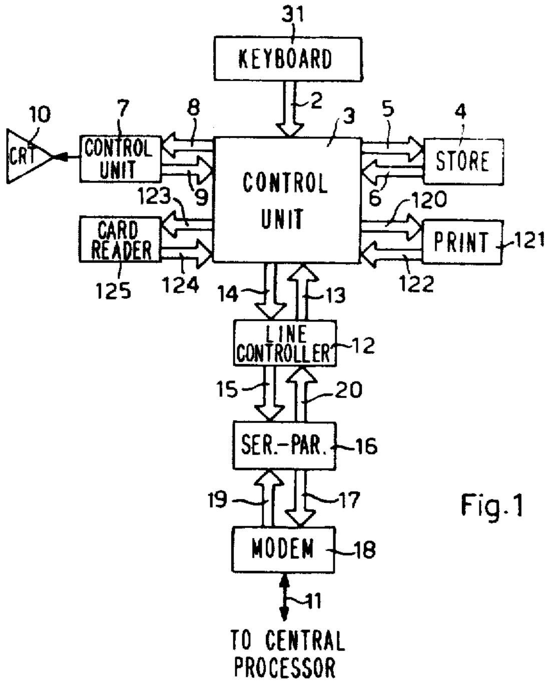
FIG. 1 shows a diagram of a complete terminal equipment embodying the invention.

With reference to FIG. 1, a keyboard 31 comprises alphabetical and numerical keys and functions to control the message. Each character leaving the keyboard is sent along the channel 2 to a control 3 of the terminal unit. The control 3 acts together with a store 4 of the recirculating delay line type through the channels 5 and 6; and with a control unit 7 for a cathode-ray tube display 10 through the channels 8 and 9. A character is sent to the store 4 along the channel 5 and simultaneously to the control 7 of the display 10 along the channel 8 in order to be displayed. The control 3, furthermore, can send the data stored in the store 4, through a channel 120, to an output unit 121, such as a printer. The printer 121 exchanges with the terminal control 3 signals of assent and control along a channel 122 (so-called handshake signals). In addition, the terminal control 3 can receive data from an input unit 125, such as a card reader, through a channel 124. Along a channel 123, the control 3 sends control and start-up signals to the card reader 125. The terminal control 3, finally, is at the disposal of a central data processer connected through a transmission line 11 to the terminal apparatus. When the processer so requires, a line control 12 governs the unit control 3, through a channel 13, to order the extraction of the message from the store 4. The message is extracted character by character through the channel 6, passes through the control unit 3, and a channel 14 to the line control 12 which transfers it through a channel 15 to a serialiser-paralleliser 16. The message is serialized by the serialiser 16 and is sent along a channel 17 to a modem 18 which is responsible for modulating it and dispatching it along the transmission line 11.

When, on the other hand, the central processer wants to send a message to the terminal, the line control 12 establishes the reception state, so that, when the terminal is ready to receive, the information bits received on the line 11 and demodulated by the modem 18 are sent along a channel 19 to the paralleliser 16 which parallelises them in such a way as to recompose the individual characters, which, through a channel 20, the line control 12, the channel 13 and the unit control 3, arrives through the channel 5 at the store 4. The control unit 3 is also responsible for governing the control 7 for displaying the same characters on the display screen 10 and for the possible output to the printing unit 121.

The line control 12 supervises the conversation procedure between processer and terminal which, in particular, can be:

- a polling process for sending enquiry messages from the terminal to the processer;
- a selection process for transmitting answering messages from the processer to the terminal.

Both processes can be of the type described in U.S. Pat. Application No. 818,366, now abandoned, and the description thereof will not be repeated here.

Figure 2:
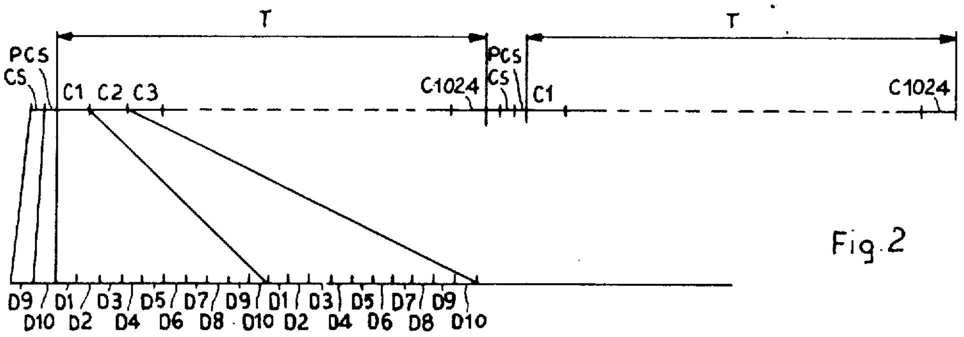
FIG. 2 shows a timing diagram relating to the division of the store.

The store 4 is constituted by a magnetostrictive delay line having the capacity of a character block. In particular, in FIG. 2, each store cycle T comprises 1024 digit periods or store cells from C1 to C1024, each comprising ten bit periods from D1 to D10. Each character in the store is represented by seven bits stored in the seven binary positions corresponding to the bit periods D3 to D9 respectively. The binary position corresponding to the bit period D10 is capable of containing a parity bit for the character. The binary position corresponding to the bit period D1 is capable of containing a service bit $bs=1$ which, during the operation of writing in the store, is continuously shifted from one store cell to the next, to indicate continuously into which store cell the next character is to be introduced.

Similarly, the binary position corresponding to the second bit period D2 is capable of containing a service bit $bl=1$, which, during the operation of reading from the store is continuously shifted from one digit period to the next to indicate from which store cell the following character to be extracted from the store is to be read.

At the head of the 1024 × 10 binary positions of the store there is a binary position which is capable of containing a timing start-up bit CS and a binary position containing the relevant parity bit PCS.

The cathode-ray tube screen 10 permits the display of 56 character positions along each of 16 lines. The individual character positions on the screen correspond precisely to the respective cells present in the delay line store. Comprised in the store, as previously stated, there are a total of 1024 cells, so that, after the 56 cells corresponding to one line of characters displayed on the screen, the eight cells directly following are left empty to allow horizontal flyback of the scanning of the display screen.

Figure 4:
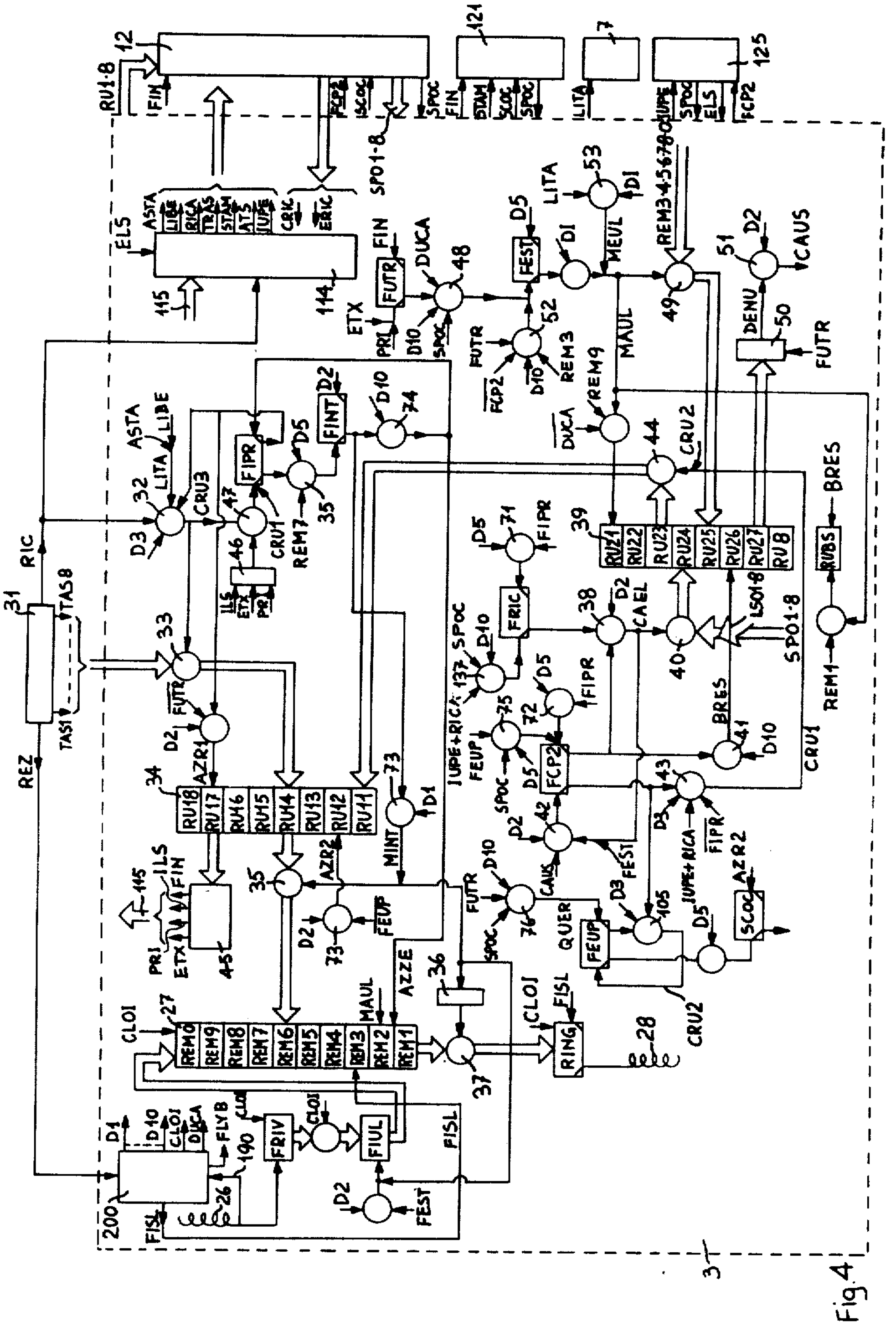
FIG. 4 shows a diagram of the terminal unit control.

The timing of the system (see FIG. 4) is effected by a timing block 200 which is adapted to provide a signal CLOI at each bit period, and repeatedly to supply trains of ten signals from D1 to D10 which are used for exact location of the corresponding bit periods of each digit period. The output transducer 26 of the delay line feeds a flip-flop FRIV (flip-flops herein are bistable) whose two outputs at the rhythm of the signal CLOI feed a flip-flop FIUL whose two outputs in turn feed the first flip-flop REM0 of a chain of ten flip-flops REMI-O connected together to form a shift register 27. The two outputs of the last flip-flop REM1 of the register 27 in turn feed a flip-flop RING which is directly connected to the input transducer 28 to the delay line. The shift register 27 and the flip-flop RING are shifted at the rhythm of the signal CLOI respectively.

TIMING START-UP

Upon the terminal equipment being switched on, a signal REZ is created which enters the timing block 200 and enables generation of the signal CLOI, which strobes the bit period.

The signal CLOI causes the shifting of the register 27. The timing block 200 furthermore supplies a signal FISL which forces a 1 bit into the flip-flop REM3 of the register 27 so that, as the register is shifted by the signal CLOI, the three flip-flops REM 1–2–3 enter the one condition. At the same time, the input flip-flop RING to the delay line is forced into the reset state by the same signal FISL. After a period of time, naturally higher than the period corresponding to three bit periods, the signal REZ ceases, so that at the first suitable front of the signal CLOI, the signal FISL is zeroized, enabling three 1 bits to be shifted in the delay line in correspondence with the bit positions *D9*, *D10* and *D1*. In fact, the timing block 200 begins to count the bit periods D1 . . . D10, from bit period D9. The three bits forced into the delay line store are, in order, the bit CS, the parity of the same, that is to say PCS, and the service bit *bs*=1.

The timing block 200 counts 1024 digit periods (store cells) comprised in the delay line. When the 1024th position has been counted, and in particular when the 1024th time that the signal D3 appears has been noted, a signal DUCA is generated by the timing block. The signal DUCA carries out logical functions described later and at the same time stops the signal CLOI from being generated. Meanwhile, the bit CS circulates in the delay line and, when it leaves the line through the transducer 26, feeds the flip-flop FRIV and, through the flip-flop FIUL, the bits present in the store enter the register 27. At the same time, the bit CS feeds the timing block 200 on the line 190, causing it to start up and the bits to be shifted in consequence in the register 27.

STATES OF THE TERMINAL

Figure 3:
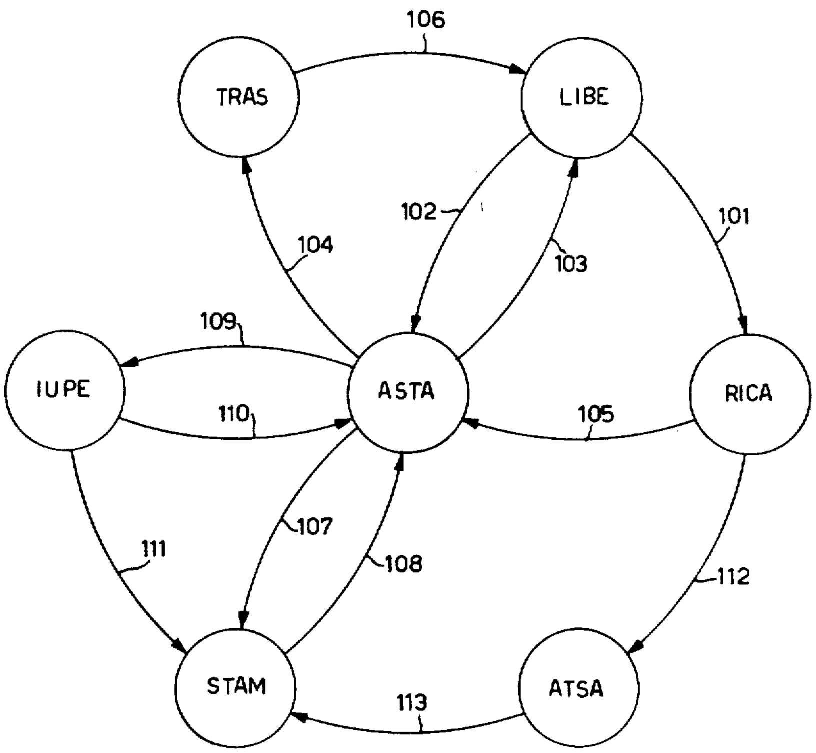
FIG. 3 shows a flow diagram of the states of the terminal.

The terminal equipment can assume various states which are represented as circles in the flow diagram in FIG. 3. The passage from one state to another is determined by operational conditions inside the terminal, by the conversation procedure of the terminal with the central processer connected to it, and by the conversation procedure with any existing peripheral units. The terminal equipment in the initial state is in the "free" state, indicated by LIBE.

On request of the line control 12, the terminal can leave the state LIBE to receive a message from the processer. In such a case, the terminal, to be able to receive the message, goes along the flow line 101 into the "reception from computer" state indicated by RICA. At the end of the reception of the information block from the processer, the line control 12 sends an instruction to the terminal control 3 which changes, through the flow line 105, the state of the terminal into "assigned to keyboard", shown as ASTA. The "assigned to keyboard" state can also be attained through the flow line 102, that is to say on request of the operator, from the state LIBE. In the state ASTA it is possible to introduce data from the keyboard to the terminal store. At the end of the introduction of the data by keyboard, if no particular keys are being operated at the keyboard, the terminal goes into the free state, through the flow line 103. After the operator has introduced the data into the store from the keyboard, he can operate a transmission key which changes the terminal state to "transmission", indicated as TRAS, through the flow line 104. In the state TRAS, the terminal equipment can transmit to the computer the information block contained in the store when the terminal-computer conversation procedure so permits. When transmission is finished, the line control 12 sends an instruction to the terminal control 3 which changes the state of the terminal to LIBE, through the flow line 106.

When the operator has introduced the data into the store from the keyboard, he can actuate a printing key which changes the terminal state to "print", shown as STAM, through the flow line 107. In the state STAM, the equipment can print, through the connected printing unit, the block of characters contained in the store. When printing is completed, that is to say when reading and extraction from the store have been completed, the state of the terminal reverts to ASTA through the flow line 108.

Moreover, the operator can depress a key for introduction from the input unit which alters the terminal from the state ASTA, through the flow line 109, to the "introduction from peripheral unit" state, shown as IUPE. In the state IUPE, data from a peripheral input unit such as a tape reader, a card reader, etc., can be introduced into the store. When the data has been introduced into the store from the peripheral unit, the terminal returns to the state ASTA through the flow line 110.

If any of the data introduced by the peripheral unit is decoded by the terminal control as an instruction to print, the terminal itself, through the flow line 111, goes into the "print" state STAM, in which all the data introduced from the peripheral unit into the terminal store is printed.

It is also possible to achieve the "print" state from the "reception from computer" state, when any of the data sent by the computer to the terminal is decoded by the terminal control 3 as an order to print. In fact, on receiving the order to print, the terminal, through the flow line 112, goes into the "await printing" state shown as ATSA. In this state, the terminal still continues to receive the data from the computer up to the end of the message when, through the flow line 113, it goes into the "print" state, in which all the data sent by the computer to the terminal are printed.

INTRODUCTION TO STORE FROM KEYBOARD

When a character in the keyboard 31 is set, eight bits TAS 1–8 are generated — seven actual bits plus one parity bit, representing the set character. At the same time, a signal RIC is created, which enters a coincidence gate 32, (FIG. 4), so that, if there is enablement by the signal LITA, expressing the logical sum of "free" (LIBE) and "assigned to keyboatd" (ASTA) terminal conditions, at time D3, with the subsequent enablement of the complementary output of a flip-flop FIPR, a signal CRU3 is set up which, through the coincidence gate 33, enables the transfer of the bits TAS1–8 into a register 34 composed of eight flip-flops RU11–18. In addition, the signal CRU3 sets the flip-flop FIPR which staticizes the information on the presence or absence of a character in the register 34. Furthermore, the signal RIC enters the state block 114 ordering the terminal state to be changed to "assigned to keyboard" ASTA.

The direct output of the flip-flop FIPR enables the coincidence gate 35, so that, when the flip-flop REM7 of the store input-output register 27 is in the set state at the time D5, thus indicating that at that moment the service bit bs is present in the aforesaid flip-flop REM7, a flip-flop FINT is set. The output of the aforesaid flip-flop FINT, passed at the time D10 by a coincidence gate 74, generates a signal AZZE which puts the flip-flops REM3–4–5–6–7–8–9 of the register 27 into zero condition. After this zeroization, at the following time D1 when a gate 73 is enabled, the direct output of flip-flop FINT causes, by the signal MINT, the transfer in parallel of the bits present in the flip-flops RU11–8 to the flip-flops REM3–0 respectively of the register 27, by enabling a coincidence gate 35. At the same time, the signal MINT, after passing through an inverter 36, disables the coincidence gate 37, so that the service bit bs does not go into the flip-flop RING and from there to the store, but is instead shifted one character period behind, the flip-flop FIUL being forced to one by the same signal MINT.

At the previous time D10, the direct output of the flip-flop FINT, passed by a coincidence gate 74 (i.e. AZZE) has reset flip-flop FIPR, whilst the same flip-flop FINT is reset at the next time D2. The complementary output of the flip-flop FIPR at the time D2 generates the signal AZR1 which zeroizes all the flip-flops of the register 34, so that it is now possible, with all the components brought back to the original condition, to introduce another character from the keyboard.

INTRODUCTION TO STORE FROM LINE

After the conversation procedure established by the line control 12, before the terminal equipment can receive a message from the central processer, it must be in the "reception from computer" state expressed by the signal RICA emerging from the state block 114. The terminal, as can be seen in FIG. 3, goes into the state RICA only from the "free" state LIBE. The signal LIBE therefore feeds the line control 12 which supervises the conversation procedure with the processer. Before the line control unit begins the said procedure, it sends back to the state block 114 a control signal CRIC which changes the terminal state to "reception from computer". When the first character of the message has reached the control 12, this latter informs the control 3 of the terminal by sending a signal SPOC. The signal SPOC enters a coincidence gate 137, so that, if the signal RICA is present which expresses the "reception from computer" condition of the terminal, and at the time D10, a flip-flop FRIC is set. The direct output of the aforesaid flip-flop enables the coincidence gate 38, so that, if the complementary output of a flip-flop FCP2 is true, showing whether an input register 39 for the characters from the line control is full or empty, the signal CAEL is generated at time D2. The signal CAEL enables a coincidence gate 40 and permits the transfer of the eight bits SPO1–8 of the character present in a register inside the line control 12 into the eight flip-flops RU21–8 constituting a register 39.

The complementary output of the flip-flop FCP2, passed at time D10 by a coincidence gate 41, had previously generated a signal BRES, which zeroizes the register 39 before the subsequent filling. The signal CAEL, besides allowing the register 39 to be filled by the character SPO1–8 arriving from the line control 12, sets the flip-flop FCP2 which staticizes the full condition of the register 39. To do so, it has been enabled by a signal CAUS, the meaning of which will be explained further on, which enables a coincidence gate 42 at time D2. The direct output of the flip-flop FCP2 feeds the line control 12 to indicate the full condition of the register 39, thus preventing the control 12 from sending the signal SPOC. In addition, the direct output of the flip-flop FCP2, at time D3, with the enablement of the signal RICA, passed by a coincidence gate 43, generates a signal CRU1 which, by enabling a coincidence gate 44, transfers the contents of the eight flip-flops RU21–8 of the register 39 into the eight flip-flops RU11-18 of the register 34. Simultaneously, the signal CRU1 sets the flip-flop FIPR, indicating in this way that the register 34 is full and setting off the logical chain for transferring the data from the register 34 to the store, already described in the case of Introduction from Keyboard. The direct output of the flip-flop FIPR, in addition, at time D5, resets the flip-flop FRIC and the flip-flop FCP2 (via gates 71 and 72 respectively), thus indicating that the register 39 is ready to receive the next character. When the entire massage from the central processer has been received (which is obtained with the recognition of an end-of-message character by the control 12), the line control 12 sends to the terminal control 3 a signal ERIC which returns the state of the terminal into condition ASTA, as can be seen in the diagram of FIG. 3.

EXTRACTION FROM STORE TO LINE

When the operator at the terminal has finished compiling the message which is completely transferred to the store, he presses a "message transmission" key in the keyboard, whereby eight bits TAS1–8 are produced. As previously described, these eight bits enter the register 34. A decoder 45 fed by the eight flip-flops of the register 34 recognizes the character which expresses the order for extraction from store and despatch to the central processer. Meanwhile, the decoder 45 generates the signal ETX which, after an inverter block 46, does not allow the flip-flop FIPR to be set, a coincidence gate 47 being disabled. Thus the whole of the logical chain, which leads to zeroization of the register 27 and to the passage of the character present in the register 34 to the register 27 is blocked.

In addition, the signal ETX sets a flip-flop FUTR, the condition of which signals the order to extract the characters from the store. At the same time, the signal ETX enters, through the channel 115, the state block 114 which indicates the terminal condition of "assigned to keyboard" (signal ASTA), thus producing the alteration of the condition to that of "transmission" (signal TRAS). The signal TRAS is supplied to the line control 12, so that, after the conversation procedure between terminal and processer, when the line control 12 is ready to receive the first character, it sends to the terminal control 3 the signal SPOC, whereby, with enablement of the signal DUCA which, as already described, indicates the end of the 1024 cells circulating in the store and remains present from the bit period D3 of the 1024th character position to the next bit period D3 inside the first character position circulating in the store, after the coincidence gate 48, it puts a flip-flop FEST into one position. The direct output of the flip-flop FEST, at the time D1, sets up a signal MAUL and at the same time enables the coincidence gate 42, whereby a flip-flop FCP2 is set, to indicate the full condition of the register 39 if the signal CAUS is present. At the same time, the signal MAUL enables a coincidence gate 49, causing the contents of the flip-flops REM3–4–5–6–7–8–0 to pass into the register 39. The contents of the flip-flop REM9, on the other hand, are prevented from transferring into the register 39 by the complement of the signal DUCA. At the same time, the contents of the flip-flop REM1 are enabled by the signal MAUL for transfer into a flip-flop RUBS. The first transfer which occurs with the presence of the signal DUCA, there being present in the register 27 only the bit CS in position D9, puts into zero state all the flip-flops RU21–8 of the register 39. In fact, the transfer of the sole bit=1, that is to say the bit CS in the ninth position, is blocked by the complement of the signal DUCA.

Before this transfer, at the time D10, with the signal BRES, as previously explained, the register 39 has been zeroized. The contents of the register 39 are sampled by a decoder 50, enabled by the signal FUTR which expresses the condition of extraction from the store. The decoder 50 recognizes a character composed entirely of zeros, its output DENU signal falls and the signal CAUS at the output of the coincidence gate 51 falls and thus does not allow the flip-flop FCP2, following the coincidence gate 42, to be set by the action of the signal FEST to indicate the full condition of the register 39. At time D2, the direct output of the flip-flop FEST, by setting the flip-flop FIUL, forces the bit *bl*=1 into the said flip-flop, whereby the bit *bl* is inserted into the bit period D2 inside the character period Cl. At the time D5, the flip-flop FEST is returned to zero condition. At the next store recirculation, when the bit $bl=1$ is recognized in the flip-flop REM3 at the time D10, with the enablement of the signal FUTR and of the complemented output of the flip-flop FCP2 (register 39 empty), the output of the coincidence gate 52 sets the flip-flop FEST. The logical flow already described is thus traversed again. In fact, at time D1 the transfer of the first character from the register 27 to the register 39 occurs. At the same time, the signal MAUL zeroizes the flip-flop REM2, eliminating the bit $bl=1$ which is shifted at the time D2 into the flip-flop FIUL, that is to say one character period behind. When the character in the register 39 is not decoded by the decoder 50 as composed entirely of zeroes, the signal CAUS is generated, thereby setting the flip-flop FCP2, staticizing the full condition of the register 39. The direct output of the flip-flop FCP2 enables a coincidence gate 105, so that the inverse output of a flip-flop FEUP, at the time D3, generates a signal CRU2 which sets the same flip-flop FEUP. The flip-flop FEUP staticizes the full or empty condition of the register 34 when it is desired to extract characters from the store to send them in output from the terminal and has been put into zero condition at the time D10 with the presence of the signals FUTR and SPOC by the signal QUER issued from a coincidence gate 76. At the time D2, the inverse output of the flip-flop FEUP, through the signal AZR2 by a coincidence gate 73', has zeroized the register 34. The same signal CRU2 enables the coincidence gate 44, so that the first character extracted from the store and introduced into the register 39 is transferred into the register 34 at the time D3. At the time D5, the direct output of the flip-flop FEUP passed by a coincidence gate 75 in the presence of the signal SPOC, resets the flip-flop FCP2, thus indicating that the register 39 is ready to receive another character from the store. At the same time, the direct output of the flip-flop FEUP at the time D5 sets the flip-flop SCOC which sends its own output to the line control 12 showing that there is a character present in the register 34 which can be extracted. The reception of the signal SCOC on the part of the line control 12 causes the latter to send the signal SPOC once again after the character extracted has been used. Meanwhile, at the following time D10, the complemented output of the flip-flop FCP2 enables the coincidence gate 52, so that, as already stated, the flip-flop FEST is set, thus giving the order for extraction from the store of the character indicated by the bit bl through the action of the signal MAUL. The signal MAUL, as already described, fills the register 39 with the character in the register 27, at the next time D1. At the previous time D10, if the signal SPOC is present which indicates that the line control 12 has used the character of the register 34, the flip-flop FEUP is reset, whereby there restarts the transfer operation of the character present in the register 39 to the register 34 and the subsequent extraction from the store of the character marked by the bit $bl=1$ in the bit position D2. When the decoding block 45 recognizes in the register 34 the end-of-message character, it decodes it by generating a signal FIN. The signal FIN enters the state block 114, returning the terminal to the condition LIBE, and also informs the control 12 of the end of transmission and resets the flip-flop FUTR.

DISPLAY

When the terminal is in the "free" or "assigned to keyboard" conditions, all the characters in the store are displayed. In fact, see FIG. 4, the signal LITA, the logical sum of the "free" (LIBE) and "assigned to keyboard" (ASTA) terminal conditions, passed at each bit period D1 by a coincidence gate 53, generates a signal MEUL which acts like the signal MAUL in the manner previously described. Thus there is obtained at each bit period D1, the transfer of the character present in the register 27 to the register 39.

Figure 5:
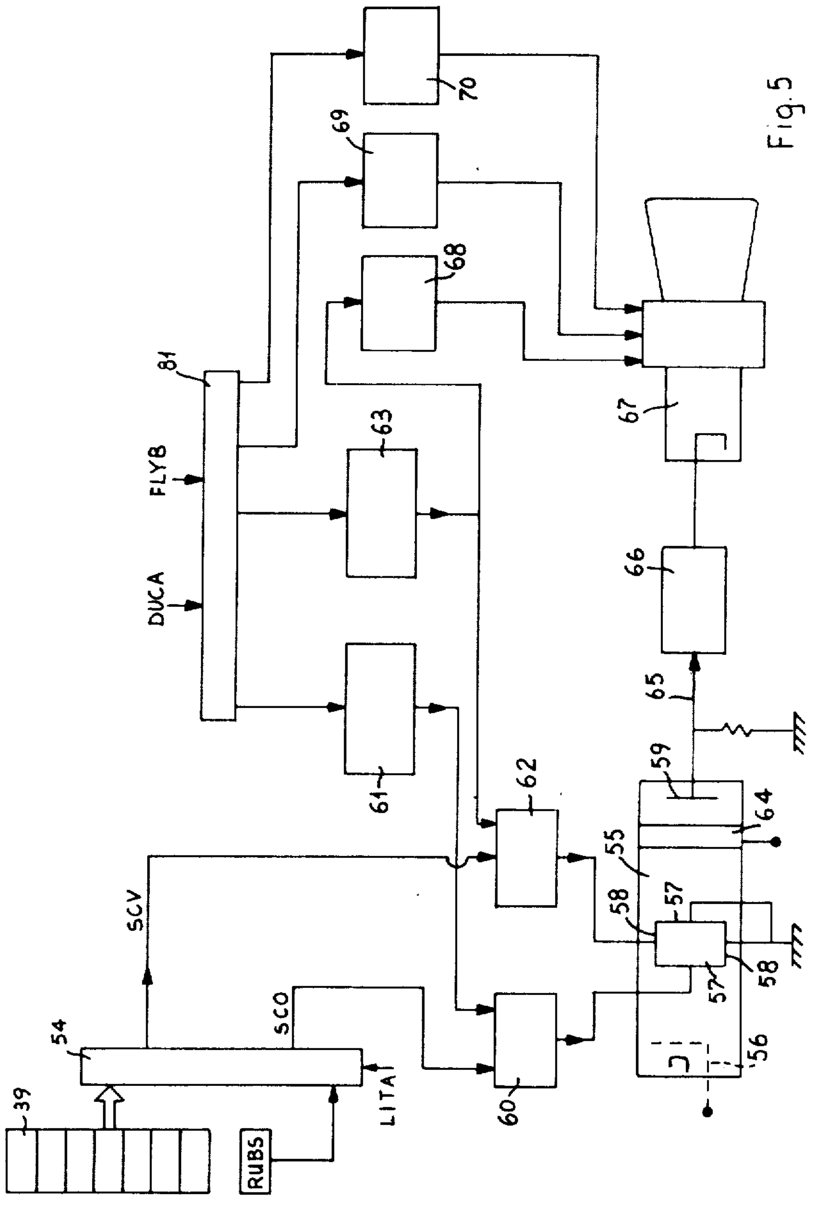
FIG. 5 shows a diagram of the control and the display device.

Display of the characters circulating in the store and transferred into the register 39 can be obtained in various ways. In particular it can be obtained by means of a character-generating tube of the type known as "Symbolray Character Generating Cathode Ray Tube" produced by the "Component Division" of Messrs. Raytheon Co., 465 Centre Street, Quincy, Mass., U.S.A. In the character-generating tube 55 (FIG. 5) the electron beam generated by the cathode 56 is deflected electrostatically horizontally by plates 57 and vertically by plates 58. At the end of the tube there is a matrix 59 on which the numerical, alphabetical and symbolical characters which it is desired to be represented are printed. The register 39 and the flip-flop RUBS and, in fact, the bit $bs=1$, when it is present and is displayed, feed a digital-analogue converter 54 enabled by the signal LITA, which provides the voltage levels SCO and SCV corresponding respectively to the horizontal and vertical coordinates of the character printed in the matrix 59, the binary code of which is present in the register 39. The voltage level SCO enters an adder 60 fed by a sawtooth signal from a generator 61. Correspondingly, the voltage level SCV enters an adder 62 fed by a sinusoidal signal from a generator 63. In this way, the character printed on the matrix 59 and located by its horizontal and vertical coordinates is scanned from left to right by an electron beam having a sinusoidal progress. By varying the secondary electron emission picked up by a collector 64, depending on whether the electronic beam meets blacks or whites, there is produced on a wire 65 a video signal which, amplified by an amplifier 66, feeds a cathode ray tube 67, i.e. the tube 10 of FIG. 1. The cathode ray tube is a magnetic deflection tube driven by three coils respectively powered by a timebase 68 which, maintaining the same phase, amplifies the sinusoidal signal emerging from the generator 63, a sawtooth signal generator 69 and a circuit 80 which generates a stepped signal for moving the beam from line to line. Thus the screen of the cathode tube 67 is scanned by an electron beam, having a sinusoidal progress, from left to right and from top to bottom. In this way, the characters selected through the tube 55 are reproduced on the screen of the tube 67. On the screen of the tube 67 there can thus be displayed 16 lines of 56 characters each, there being a perfect correspondence with the number of cells present in the store. The synchronism of the analogue control of the two tubes 55 and 67 with the control of the delay line store is obtained by means of a timing circuit 81 which starts the sawtooth signal generators and the stepped signal generators, as well as the oscillator 63. The block timing circuit 81 is fed by the signal DUCA which, as has been said, indicates the end of the store and by the signal FLYB which indicates the end of the line, emerging from the timing block 200.

OUTPUT TO PERIPHERAL UNIT, MORE ESPECIALLY PRINTER, CONTROLLED BY KEYBOARD

The operation of printing is similar in many ways to the operation of extracting from store to line. In fact, when the operator has finished compiling the message which is transferred completely to the store, he sets a "print" key on the keyboard 31 whereby eight bits TAS1–8 are produced which, as previously stated, enter the register 34. The decoder 45 recognizes the character which expresses the order to print, whereby it generates a signal PRI which, inverted by an inverter 46, prevents the flip-flop FIPR being set, disabling the coincidence gate 47. Thus, the whole of the logical chain which leads to the zeroization of the register 27 and to the passage of the character present in the register 34 to the register 27 is blocked. In addition, the signal PRI sets the flip-flop FUTR to signal the order to extract from the store. At the same time, through the channel 115, the signal PRI enters the block 114 bringing the terminal to the "print" condition (STAM). The printing unit 121, which may be of the type described in our U.S. Pat. No. 3,356,198, receives the signal STAM, whereby, when the printing unit is ready to receive the first character, it sends the signal SPOC to the control of terminal 3. The course of the operation is identical to the case already described in Extraction from Store to Line. In fact, the signal MAUL causes the first character to be transferred from the register 27 to the register 39, the signal CRU2 causes the same character to be transferred from the resister 39 to the register 34. The terminal control 3 informs the printing unit 121 by the signal SCOC of the presence of a character in the register 34 ready to be printed.

Reception of the signal SCOC causes the signal SPOC to fall at the printing unit 121, which will send the signal SPOC once more after the extracted character has been used. When the block 45 decodes the end-of-message signal, it generates the signal FIN which restores the terminal to the state ASTA and simultaneously informs the printing unit 121, which stops.

PRINTING CONTROLLED BY COMPUTER

The operation of printing, like any operation consisting of sending the message contained in the store to an output unit 121, can also be ordered by the remotely connected processer. In fact, within the message sent by the computer there may be an order-to-print character. The message is transferred character by character into the store as previously described, and when the block 45 decodes the order to print present in the register 34 is emits a signal PRI, which, by entering the block 46, prevents the character from being introduced into the store. Moreover, the signal PRI is sent to the state block 114 causing the terminal state to be changed from "reception from computer" to "await printing". The block 114 continues to generate the signal RICA, so that in this way the message continues to be received from the processer by the terminal. As stated, the terminal is also in the "await printing" (ATSA) condition, so that, when the whole message has been received, the line control 12 sends to the terminal control 3 a signal ERIC which, on being introduced into the block 114, causes the terminal to pass into the "print" (STAM) state. As previously described, the printing unit 121 receives the signal STAM, so that, when the printing unit is ready to receive the first character, it sends to the control 3 the signal SPOC.

Previously the signal PRI had set the flip-flop FUTR, whereby, with the signal SPOC, it begins the logical chain already described which leads to the extraction from the store of the characters (in order) to be sent via the registers 39 and 34 to the printing unit 121. At the end of the printing of the message, as already stated, the terminal returns to the state ASTA.

INPUT FROM PERIPHERAL UNIT

As previously stated, the terminal unit can be connected to a peripheral unit 125 through the channels 123 and 124. This peripheral unit may, in particular, be a card reader. In order to obtain a message from the peripheral unit, the operator sets on the keyboard a key for input from peripheral unit. On the wires TAS1–8 a code is generated which, as already described, enters the register 34. The decoder 45 decodes the character for input from peripheral unit and generates a signal ILS. The signal ILS enters the block 46 and, disabling the gate 47, does not allow the passage into the store of the character itself. Through the channel 115 the signal ILS feeds the state block 114, bringing the state of the terminal to the "input from peripheral unit" state IUPE. The signal IUPE is sent to the card reader 125. When the card reader 125 is ready to send the first character to the terminal, it informs the control 3 by sending a signal SPOC which enters the coincidence gate 137, starting the logical sequence already described in the case of Introduction to Store from Line. In fact, the signal CAEL is generated, which, by enabling the coincidence gate 40, allows the transfer of the eight bits LSO1–8 of the character supplied by the card reader 125. The direct output of the flip-flop FCP2 feeds the reader 125 to attest the full condition of the register 39, thus preventing the reader from sending the signal SPOC. At time D3, as already described in the case of Introduction from Line, the signal CRU1 is generated, which transfers the content of the register 39 to the register 34 and sets the flip-flop FIPR, beginning the logical chain devoted to the transfer of the character from the register 34 to the store. When the card reader 125 has finished transmitting the message, it sends to the terminal control 3 a signal ELS, which, having entered the block 114, returns the state of the terminal to "assigned to keyboard" ASTA.

PRINTING CONTROLLED BY PERIPHERAL INPUT UNIT

The operation of printing, like any operation consisting in sending the message contained in the store to an output unit 121, can be controlled by the input unit 125, more especially by the card reader. In fact, within the message supplied by the unit 125 there may be an order-to-print character. As already described, the message is transferred character by character from the card reader 125 to the store, and when the decoder 45 decodes the order to print present in the register 34, it emits the signal PRI, which, on entering the inverter 46, prevents the character from being introduced into the store. In addition, the signal PRI is sent to the state block 114 without producing any change of state for the time being. The block 114 continues to generate the signal IUPE, so that the terminal continues to receive the message from the card reader 125. When the whole message is transmitted, there is sent to the terminal control 3 the signal ELS which enters the block 114. Because of the previous presence of the signal PRI, the signal ELS, instead of causing the terminal to pass into the state ASTA, causes it to pass into the "print" state STAM. As already described, the printing unit 121 receives the signal STAM, whereby, when it is ready to receive the first character of the message in store, it sends the signal SPOC to the control 3. With the signal SPOC the extraction of the characters from the store and their despatch to the printing unit 121 is begun. At the conclusion of the printing of the message, as already described, the terminal returns into the "assigned to keyboard" state ASTA.

What I claim is:

1. Data terminal equipment including a recirculating serial store for storing data, display means conditionable for displaying the data stored in the store, a control unit for so conditioning said display, said control unit including control means for defining different states of operation of the equipment and for selectively connecting said store to a central processor, a peripheral output unit conditionable by said control means for recording the data stored in said store and a peripheral input unit conditionable by said control means for transmitting data to be stored in said store, wherein the improvement comprises:

generating means included in said control unit and conditionable for generating instruction signals, said generating means being so conditioned either by said central processor or said input unit according to a present state of operation of the equipment, and causing means included in said control unit and responsive to the instruction signals generated by said generating means for causing said control unit to pass from said present state of operation to a predetermined state of operation.

2. Data terminal equipment as claimed in claim 1, wherein said instruction signals from the central processor or the input unit comprise a control code which can be inserted anywhere in a message from the central processor or the input unit, said terminal including a keyboard for selectively generating said control code, said generating means including a register adapted to register the reception of this control code and a decoder means for decoding said control code and accordingly controlling said causing means.

3. Data terminal equipment according to claim 2, wherein said control unit includes a first register connecting the input and output of the recirculating serial store, gate means for causing a second register to receive the data from the first register, from the peripheral input unit and from a transmission line connected to a central processer, and to supply the data to the display device and to a third register, and further gate means for causing the third register to receive the data from the second register and from the keyboard and to supply the data to the first register, to the transmission line, and to the peripheral output unit.

* * * * *